US011438170B2

(12) United States Patent
Burke

(10) Patent No.: US 11,438,170 B2
(45) Date of Patent: Sep. 6, 2022

(54) INTERSTITIAL 3D SCENE INFORMATION IN VIDEO STREAMS

(71) Applicant: McAfee, LLC, San Jose, CA (US)

(72) Inventor: Daniel L. Burke, Portland, OR (US)

(73) Assignee: McAfee, LLC, San Jose, CA (US)

( * ) Notice: Subject to any disclaimer, the term of this patent is extended or adjusted under 35 U.S.C. 154(b) by 167 days.

(21) Appl. No.: 16/804,307

(22) Filed: Feb. 28, 2020

(65) Prior Publication Data

US 2021/0273811 A1 Sep. 2, 2021

(51) Int. Cl.
*H04L 9/32* (2006.01)
*H04N 13/161* (2018.01)
*H04N 19/597* (2014.01)
*H04N 21/8352* (2011.01)
*G06V 20/40* (2022.01)

(52) U.S. Cl.
CPC ............ *H04L 9/3247* (2013.01); *G06V 20/41* (2022.01); *H04L 9/3242* (2013.01); *H04N 13/161* (2018.05); *H04N 19/597* (2014.11)

(58) Field of Classification Search
None
See application file for complete search history.

(56) References Cited

U.S. PATENT DOCUMENTS

| | | | |
|---|---|---|---|
| 8,954,605 B1 * | 2/2015 | Hecht | H04L 51/18 709/245 |
| 9,129,158 B1 * | 9/2015 | Medasani | G06K 9/00718 |
| 2019/0222878 A1 * | 7/2019 | Cocchi | H04N 21/2541 |
| 2020/0126283 A1 * | 4/2020 | van Vuuren | G06T 13/205 |

OTHER PUBLICATIONS

Khan et al., "Intelligent reversible watermarking and authentication: Hiding depth map information for 3D cameras," Information Sciences 216 (2012) 155-175. (Year: 2012).*

* cited by examiner

*Primary Examiner* — Christopher Braniff
(74) *Attorney, Agent, or Firm* — Patent Capital Group

(57) ABSTRACT

There is disclosed in one example a digital video camera, including: an analog picture element; an analog-to-digital converter (ADC) to digitize input from the analog picture element; a three-dimensional (3D) scanner; compiling logic to compile the digitized input into a video stream; and insertion logic to insert interstitial 3D scene data into the video stream.

20 Claims, 10 Drawing Sheets

INTERSTITIAL 3D SCENE INFORMATION IN VIDEO STREAMS

FIELD OF THE SPECIFICATION

This application relates in general to network security, and more particularly, though not exclusively, to a system and method of providing interstitial three-dimensional (3D) scene information in video streams.

BACKGROUND

Common video processing techniques rely on video compression that does not require the replication of every pixel in each frame. Rather, these video processing techniques may rely on so-called "keyframes," which include the complete information for rendering a frame. Follow-on frames, called for example p-frames or b-frames, include information required to interpolate the image from the previous inter-frame (i-frame). Variations on this technique are found in video encoding standards such as Moving Pictures Expert Group 2 (MPEG-2), H.264, and Ogg Theora.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
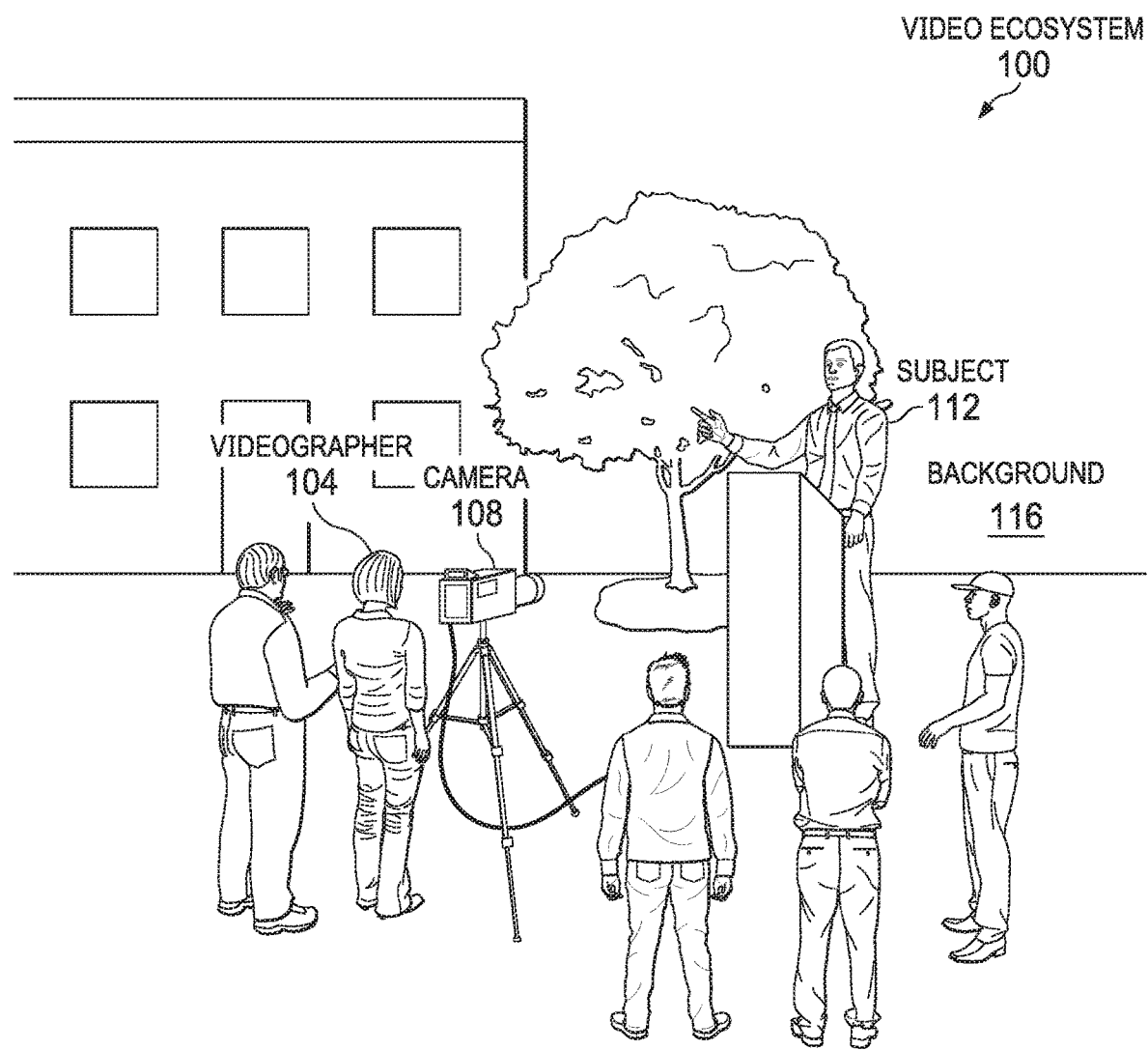
FIG. 1 illustrates a perspective view of a video ecosystem.

In an example, there is disclosed a digital video camera, comprising: an analog picture element; an analog-to-digital converter (ADC) to digitize input from the analog picture element; a three-dimensional (3D) scanner; compiling logic to compile the digitized input into a video stream; and insertion logic to insert interstitial 3D scene data into the video stream.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The advent of so-called "deep fake" technology threatens to fundamentally undermine societal understanding of historical recordings. It has long been possible to convincingly alter still photographs to make them appear to be something other than what they are. Indeed, the convincing alteration of photographs has a history extending almost as far back as the history of still photography. For example, in 1870, a clever charlatan (early American "spirit photographer" William H. Mumler) was able to produce for Mary Todd Lincoln a doctored photograph that appeared to show her husband, the deceased President Abraham Lincoln, standing over her in ethereal form. This photograph has long since been debunked as a product of clever exposure of an old photograph onto a new negative frame.

However, humans have long trusted that an audio recording of a familiar voice is correctly attributable to the owner of that voice. To an even greater extent, a video of a person or thing—particularly if it is a high quality video—is convincing of the truth of the thing allegedly recorded.

But modern computer technology is capable of producing extremely convincing fake audio and video recordings. These so-called "deep fakes" can portray a person saying or doing something that they never did. These can be so convincing that it is difficult to tell a high quality deep fake from a legitimate recording, even for a skeptical or wary user, and even with the aid of computer processing and technologies. For example, one Quentin Beck is alleged to have created a very convincing video of a young man named Peter Parker implicating himself in crimes for which he is not genuinely responsible.

Deep fake technology is improving rapidly enough that it may soon be difficult or even nearly impossible to distinguish manipulated video from original, unaltered video. This can have serious implications in politics, criminal law, international relations, and other fields. Even with concrete, recorded evidence, disputes can become a matter of he-said/she-said, because even audio and video recordings cannot be completely trusted.

Embodiments of the present disclosure provide a trust ecosystem in which content can be automatically produced with a confident scoring of whether a video is real and unaltered. Part of the process involves digitally signing the video. Digitally signed video already exists; for example, some existing cameras include a hardware encoded key that can be used to sign video captured with the camera. As long as the video remains unaltered, the key remains valid, and users may trust that the video came from the camera and was not altered, thereafter. However, even this trust mechanism can be defeated. For example, one relatively new technique is to digitally alter a video on a computer, and then carefully set up a digitally signed camera to record a monitor playing the altered video. This creates a digitally signed video that legitimately has come from the camera unaltered, but that still includes deceptive content. Such a digitally signed fake video may be doubly nefarious, because not only does it have deceptive content, but the deceptive content carries convincing credentials in the form of a digital signature.

In an embodiment, a recording device may be assigned a hardware encoded private key. To create an authenticated video, the camera may use scanning technology (such as a low-power laser) to record three-dimensional (3D) spatial information in connection with the video. The 3D spatial data may be encoded interstitially into the video, such as at the location of each i-frame. A digital signature can then be created using both the video data and the 3D spatial data, in combination. The combination of the digital signature and the 3D spatial data can then be used to authenticate the video.

For example, a video may be taken of a prominent politician in a first location giving a speech. This video could then be altered to either change the politician's location, change the words of the speech, or even to swap out the politician with a different speaker. Once the video has been altered, an attacker could use a camera with 3D scanning and signing capabilities to record the altered video off of a computer screen. But this video would be fairly simple to identify as a fake, because the 3D scene information included with the video would show not the apparent setting, but rather a flat computer monitor. This would be convincing evidence that the video was altered on a computer, and then recorded off of the computer monitor.

In some embodiments, synchronization of 3D scene data with the video i-frames for purposes of creating a special digital signature may be referred to as a "real video signature." If a digital signature is created for a video without the 3D scene information, the authenticity certification is relatively easy to circumvent. For example, the videographer can alter existing video or create a fake video, then point their video camera device at a high-quality screen playing the video, and end up with a fake video from the video camera device that has a false certification. But, with the 3D scene information included as part of the video signature, this deep fake technique becomes difficult or impossible. The deep fake video can be spotted relatively easily due to the mismatching 3D scene information.

The technology for creating 3D scene information may be adapted from existing uses. For example, some smartphones already have 3D facial recognition technology. This facial recognition technology is not easily fooled by, for example, simply putting a photograph of the authorized user in front of the camera. The phone uses a low intensity laser to perform a near-field 3D scan of the user's face. Thus, the camera recognizes not only the appearance of the user's face, but three-dimensional features such as depth and object placement. This technology is also adapted for use in far-field scanning. For example, a video camera may be equipped with scanning lasers that can map background features while recording. In some embodiments, to prevent the file size of a recording from becoming unmanageable, 3D scene information may be mapped using low-polygon resolution, in which a relatively small number of polygons are overlaid on the 3D scene. This low-polygon representation is enough to verify, after the fact, that the scene was actually shot in a real location, in contrast to being recorded from a high-resolution video screen. Furthermore, the low-polygon 3D scene information need not be included with every frame of the video. Rather, the information may be encoded into every keyframe, every i-frame, selected keyframes, selected i-frames, every nth frame (e.g., every 10th frame, every 24th frame, every 60th frame, every 100th frame, every 1000th frame, or similar), or at time intervals such as every second, every 10 seconds, every minute, or at some other useful time interval. The inclusion of these frames with 3D scene information may be referred to as interstitial 3D frames. These interstitial 3D frames may be used to verify the physical setting of the recording, while the detail of the verification will depend on the detail of the 3D model. For low-polygon representations, the 3D scene information can at least be used to verify that the scene was not filmed on a flat computer monitor. If higher resolution is used, then very detailed 3D information about the scene can be reconstructed.

Indeed, while verifying video integrity is one illustrative example of a use of interstitial 3D frames, it is not the only application. In other cases, interstitial 3D frames could be inserted to enable re-creation of a 3D scene after the fact. This could be used to create 3D models of the scene, or for other artistic purposes.

In an illustrative embodiment, a recording device such as a digital video camera includes a hardware encoded digital signature that is used to sign a video. In some cases, the inclusion of a signature may be a user-controlled feature. If the operator of the camera decides to include the signature, then the video is produced with the accompanying 3D model information, and the video is signed with a hardware encoded key that is difficult to replicate or defeat by brute force. This digital signature may be provided per make or model of camera, or even more beneficially, per individual camera. This ensures that a video can be traced back to the exact camera that took the video. Furthermore, because each camera may have a unique hardware encoded ID, this scheme cannot be defeated by, for example, brute forcing the key for a specific make or model of camera.

Once a digital video has been produced and released to the public, then verification may take several forms. In one illustrative example, a security services provider provides a certification scheme. If a video is submitted to the security services provider without a digital signature, then it may be assigned a "suspicious" reputation (e.g., "red"). This indicates that the video cannot be verified, and that the user is essentially on their own in deciding whether the video is authentic.

On the other hand, if a video is provided with a digital certificate that lacks any 3D scene information, the video may be assigned an "unknown" or intermediate reputation (e.g., "yellow"). This indicates that the video is signed, but that it is not possible to determine whether there is matching 3D model information in interstitial frames. Because this video is at least signed, it may be considered more trustworthy than an unsigned video. In this case, a user may look for signs of being recorded off of a separate monitor, such as screen flicker, visible bezels, or other tells. If a video is submitted with interstitial 3D data, then before the video is certified, it may be subjected to additional analysis. For example, a first pass analysis may be to determine whether the 3D model information indicates that the video was filmed on a flat surface. If this is the case, then the video may be assigned a "red" reputation, indicating that it is more likely to be a fake because it was filmed off of a computer monitor. However, if the video was filmed in a legitimate 3D environment, then it is more likely to be genuine.

It is possible, however, that a user may attempt to tamper with this ecosystem by tampering with the camera, using fake scenery as a stand-in for the 3D model, or otherwise altering the video stream. In this case, a machine learning model may analyze the video. Over time, the machine learning model may identify characteristics of deep fake videos that have been modified. For example, even if the encryption key has been brute forced and a digital signature has been given to a tampered-with video, there may be characteristics of the video that indicate the tampering. The use of a machine learning model can help in the case of "unknown unknowns," where there may be no foreknowledge of the methods that are used to tamper with a video.

The teachings described herein allow for multiple use cases for authenticated videos. For example, a videographer may choose to have a video they record contain a signature that will allow it to be authenticated as being actually recorded by the device associated with that particular individual or organization. This helps to ensure that the video was not doctored after it was recorded on the recording device.

In another use case, a videographer could submit an anonymous video with the real video digital signature to ensure that it was a real video and not a fake video. As long as the user does not associate his or her true identity with the digital signature of the device used, the user may still maintain anonymity while uploading the video. This can be useful in allowing anonymous videographers to avoid retaliation from powerful parties who may not wish to have these videos shown. The signature can be verified, but in some cases, may be structured so that it can be tied to a specific device only if that device, itself, is found. For example, the signature may include a one-way hash so that the device that filmed the video can be verified, if it is available. In some cases, the one-way hash may provide enough two-directional information that the video can be tied to a particular make or model of device, so that the video can at least be authenticated as having come from a legitimate video device. However, without the actual device, the video cannot be tied to a particular individual.

In some cases, videos are re-compressed when they are submitted to video sharing sites. This re-encodes the videos, and causes them to lose the signature. In this case, a video could be authenticated by the video sharing site when the file is uploaded. The video sharing site can then provide authentication verification status next to the video. For example, the video could have a green, yellow, or red badge next to it, indicating the type of verification that was performed on the video when it was uploaded. Thus, although the re-encoded video does not have a usable signature, as long as the user trusts the video sharing site to provide valid information, the user can trust that the original video, when uploaded, had a valid signature.

3D scene information capture technology has been present in existing systems for some years. For example, the Xbox Kinect and the Apple iPhone X include short-range 3D scene information technology (e.g., Apple Face ID). A video camera device according to the teachings of the present specification is one that includes the capability of recording two-dimensional (2D) video with interstitial 3D scene information.

A system and method for providing crowdsourced reputations for wireless networks will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 illustrates a perspective view of a video ecosystem 100. Video ecosystem 100 shows a scene in which a videographer 104 is operating a video camera 108 to film a subject 112. In this case, subject 112 is a human subject, although any suitable subject 112 could be used. Subject 112 stands against a background 116. Because the scene being filmed exists in real 3D space, both subject 112 and background 116 have genuine 3D features. In some cases, camera 108 could be equipped with a scanning mechanism, such as a low intensity laser, radar, lidar, infrared beam, or other 3D scanning technology. Such scanning technology is used, for example, in smartphones that perform a 3D scan of a face for biometric authentication. This provides superior biometric authentication to simple two-dimensional facial recognition.

In the era of deep fake news, it may be desirable for videographer 104 to certify that her recording of subject 112 is in fact legitimate, and has not been tampered with. This could include operating a camera 108 that digitally signs the recording produced of subject 112. The digital signature may include a hash of the original video, which ensures that the video has not been tampered with or edited since it was recorded.

Figure 2:
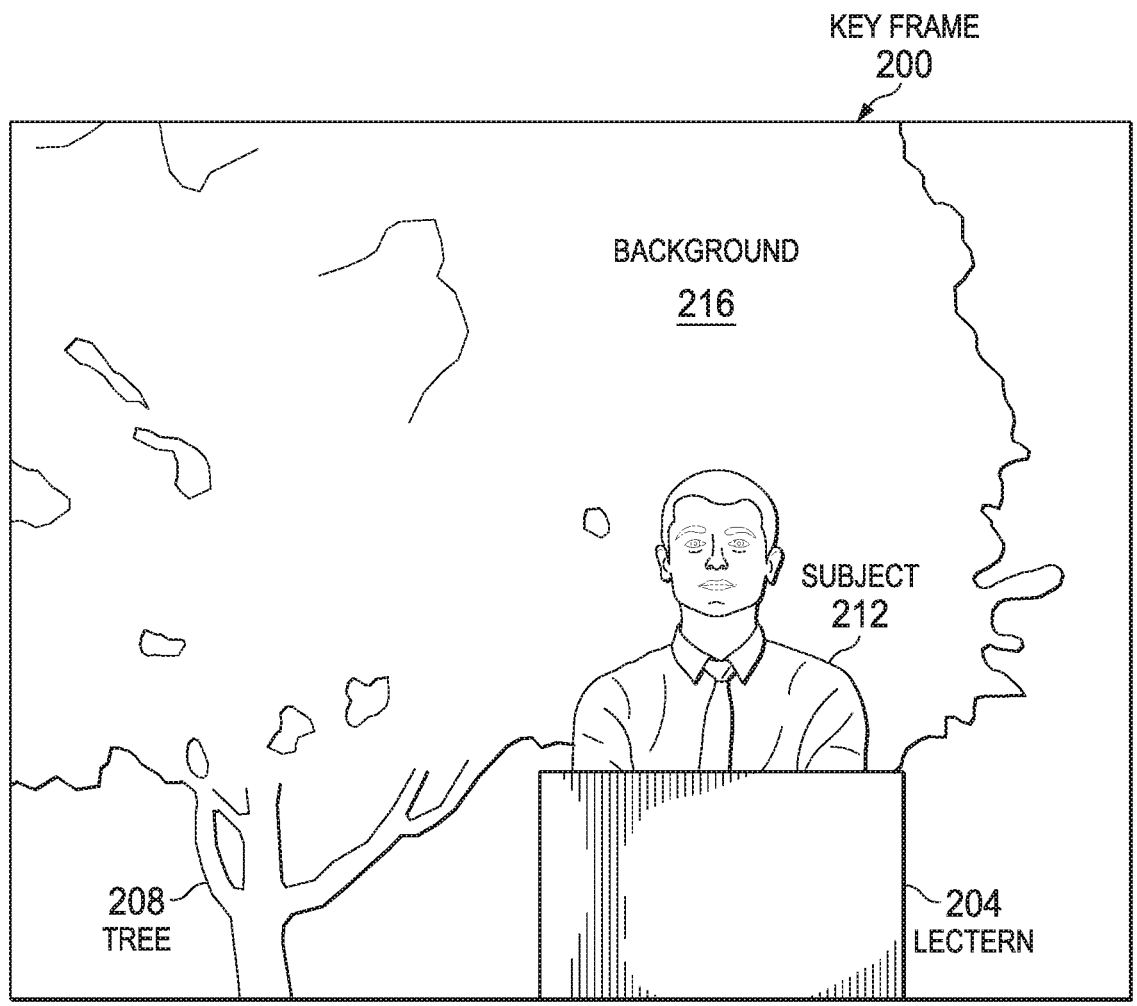
FIG. 2 is an illustration of a keyframe that may be viewed in the context of FIG. 1.

Turning to FIG. 2, a keyframe 200 is shown. FIG. 2 may be viewed in the context of FIG. 1. Keyframe 200 may be a type of frame in a video compression scheme. For example, a video compression scheme may rely on occasionally producing a frame with a full two-dimensional image of the scene. Subsequent frames may then be encoded as deltas from the original keyframe. Using keyframe 200 as an example, there may be little or no movement in background 216. For example, tree 208 is expected to stay put most of the time, and even the leaves may experience only a small amount of movement (e.g., if they are rustled by the wind). Subject 212 standing in front of lectern 204. Lectern 204 is also expected to experience little or no movement in subsequent frames.

Subject 212 may move some, by way of facial expressions, gesticulations, and other activities. But even for subject 212, some aspects remain the same, such as he will probably keep on the same shirt and tie, and will have the same hair.

Thus, in compressing the video stream, keyframe 200 can be used as a baseline, and a number of subsequent frames include only deltas from the keyframe. In some video compression schemes, keyframe 200 may be called an "i-frame," while subsequent frames with delta information may be called b-frames and p-frames. This is a nonlimiting example, and other video compression schemes may be used.

When validating that the video produced by videographer 104 is not a deep fake, one concern arises even in the presence of a digital signature that verifies that the video has not been altered since it was produced. For example, videographer 104 could film subject 112, go back to her studio, and upload the video to her computer. She could then tamper with the video and create a new deep fake video. Videographer 104 could then take camera 108, and with careful positioning and set up, film a high-resolution display screen that plays back the altered video. In this way, videographer 104 could not only create a convincing deep fake video, but could also create the video with a digital signature that certifies that the video has not been tampered with. This increases the power and deceptiveness of the deep fake, because it appears to carry a certificate of authenticity.

Figure 3:
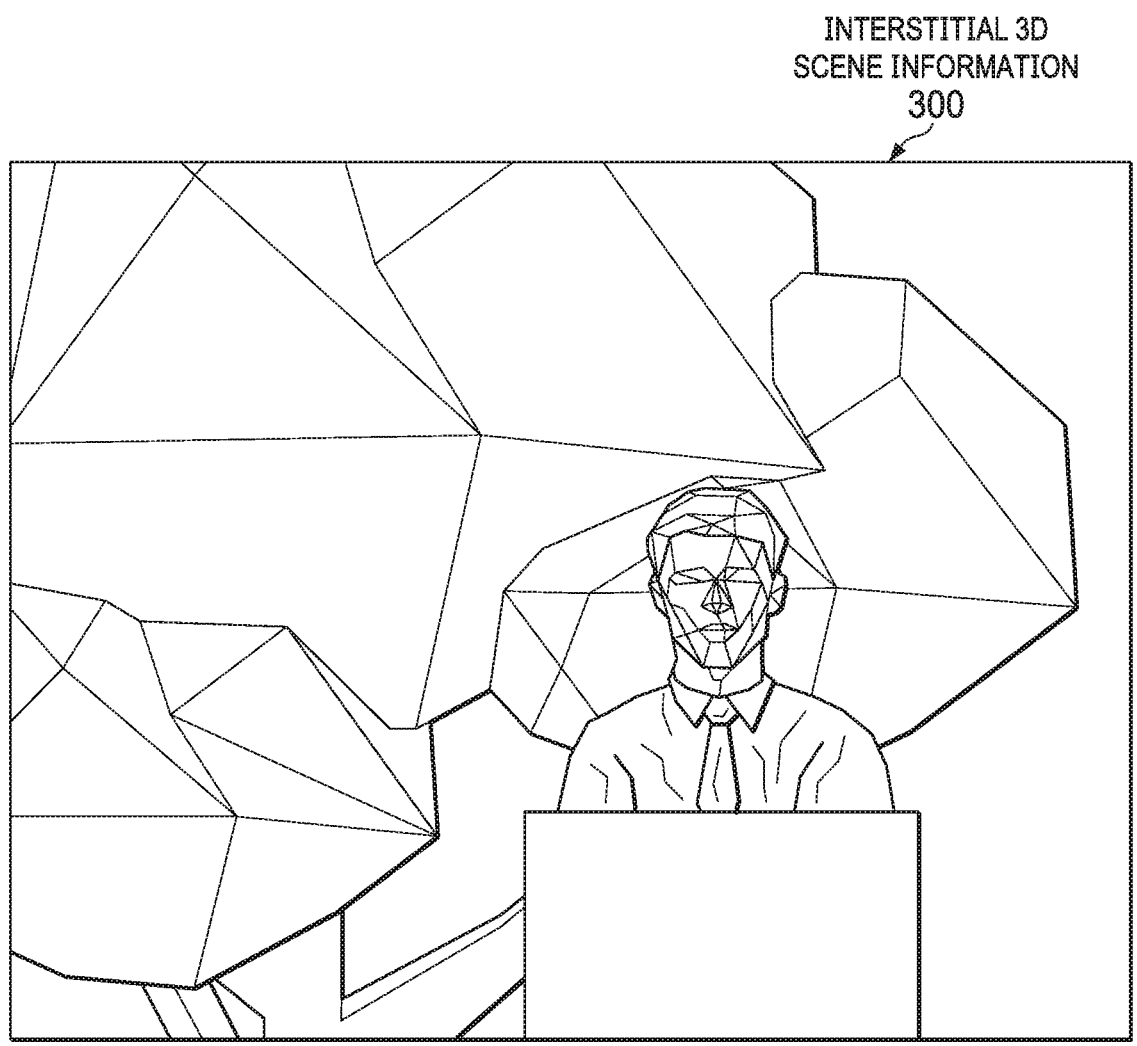
FIG. 3 is an illustration of example of interstitial 3D scene information.

Turning to FIG. 3, an example of interstitial 3D scene information is shown. In this example, interstitial 3D scene information 300 is a low-polygon rendering of 3D scene information that can be collected from video ecosystem 100. As described above, camera 108 could be equipped with a suitable 3D scanning means, such as a low intensity laser, or similar. The 3D scanner could be used to create a near-field or far-field scan of the 3D scene being recorded.

There are many uses for such 3D scene information, such as reconstructing the 3D scene, adding richer content to the video, or otherwise providing additional information for future usage. In the context of deep fake detection, interstitial 3D scene information 300 need not be a high-resolution 3D scan. Indeed, it may be advantageous to use a low-resolution or low-polygon scan, as illustrated. With the low-polygon representation shown in FIG. 3, interstitial 3D scene information 300 can be digitally encoded in a very compact form, such as a scalable vector graphics (SVG) format that includes vector data. SVG is disclosed as an illustrative and nonlimiting example only, and any other digital representation of a 3D scene could be used. The benefit of using a low-polygon representation with a highly compressible and efficient digital format is that interstitial 3D scene information 300 need not contribute substantially to the size of the video file.

In some embodiments, a 3D scan is made and interstitial 3D scene information 300 can be inserted for each keyframe 200, as illustrated in FIG. 2. The interstitial 3D scene information can optionally be included in a separate digital data track, with synchronization information so that interstitial 3D scene information 300 can be correlated to keyframe 200.

In the context of deep fake detection, the entire digital video file, including the video stream and the interstitial 3D scene information, can be hashed and a secure and encrypted digital signature can be applied to the video file. A human user or a machine learning model could then check whether interstitial 3D scene information 300 substantially matches keyframe 200 throughout the video. For example, if keyframe 200 shows subject 212, background 216, and other deep information, while interstitial 3D scene information 300 shows only a single flat surface, then this would make the video suspect. This may indicate that a tampered video was filmed from a flat screen. But if the 3D scene information matches the keyframes, then there is higher confidence that the video is genuine.

Inserting a frame of interstitial 3D scene information 300 with each keyframe 200 is disclosed as an illustrative and nonlimiting example of one option. In other cases, other techniques could be used. For example, interstitial 3D scene information 300 could be inserted with every frame. This may result in a rather large video file, but has the benefit of creating essentially a 3D video. In some cases, full 3D scene information could be inserted with i-frames, and 3D scene information deltas could be inserted with b-frames and p-frames.

In other examples, 3D scene information could be inserted at regular time intervals, whenever the scene changes (e.g., if there is a major scene change, or a scene change of greater than 30 or 40 percent between frames), at random intervals, every N frames, or any other selected interval.

Figure 4:
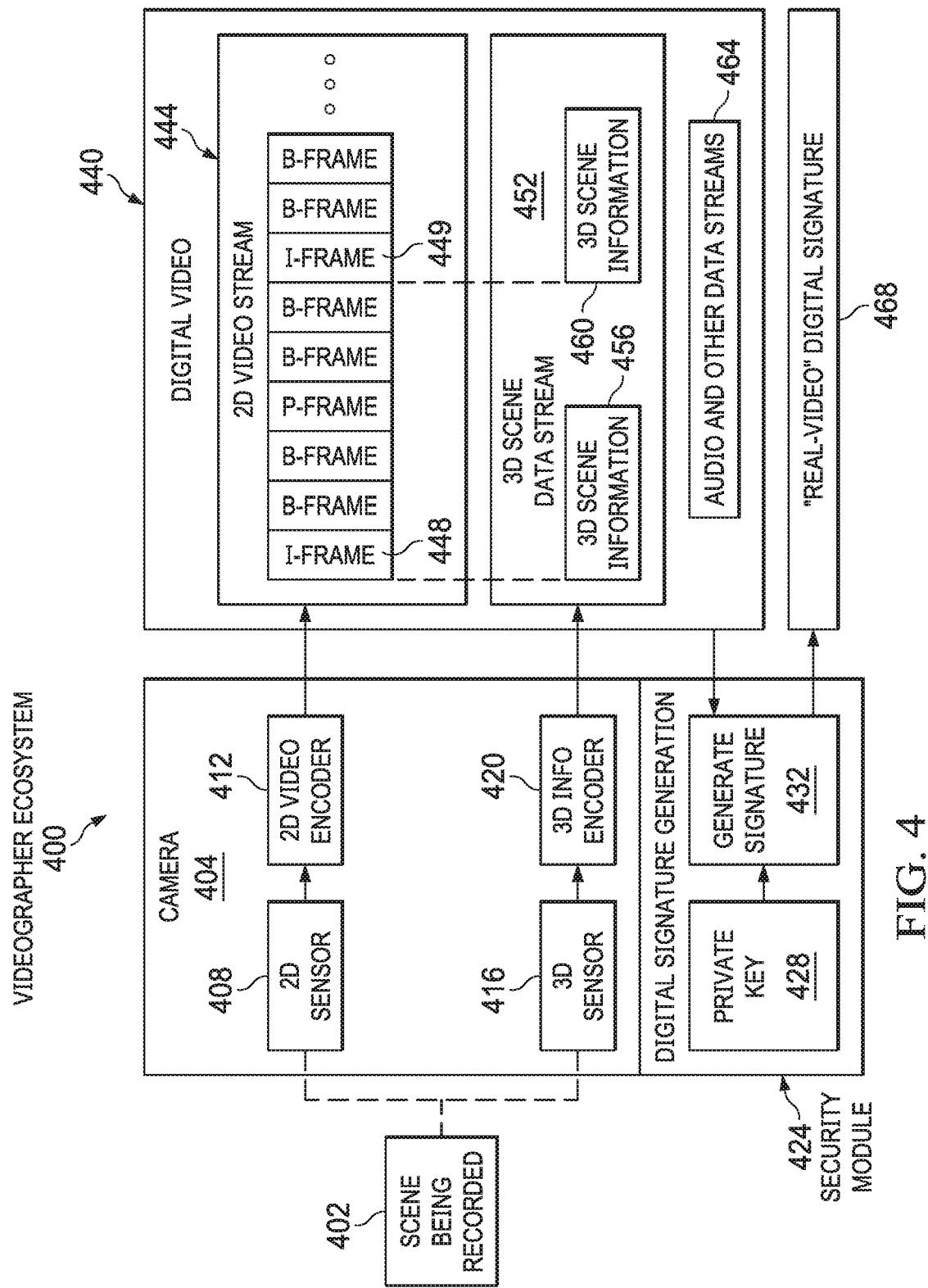
FIG. 4 is a block diagram of a videographer ecosystem.

FIG. 4 is a block diagram of a videographer ecosystem 400. In this example, videographer ecosystem 400 includes a scene being recorded 402, a camera 404 recording the scene, and a digital video file 440 produced by camera 404.

Scene being recorded 402 could be any suitable scene, such as the scene illustrated in FIG. 1, or some other scene.

Camera 404 includes analog sensor elements, including a 2D sensor 408 and a 3D sensor 416. 2D sensor 408 could be a standard light-sensitive camera element. This could include both lenses and photodetectors, and/or any suitable combination, thereof. A 2D video encoder 412 may include one or more analog-to-digital converters, as well as logic to encode the digital data into one or more frames. This could include a compiling element that compiles a number of frames per second, such as 24 or 60 frames per second, by way of nonlimiting example. This compiling element compiles the images into a stream, which optionally includes video compression, according to any suitable video compression technology. The output of 2D video encoder 412 is a 2D video stream 444. 2D video stream 444 includes, in this example, a plurality of i-frames 448, which are followed by a series of one or more b-frames and/or p-frames, according to the compression technology used. I-frames 448 may be keyframes such as keyframe 200 of FIG. 2.

Camera 404 also includes a 3D sensor, which could be any suitable 3D sensor technology, such as a low intensity laser, radar, lidar, infrared detectors, or other means for building 3D information. This could include one or more near-field and/or far-field scanners. For example, near-field scanners may be used to scan a face very near the device, whereas far-field scanners could be used to scan a broader scene, such as the one illustrated in video ecosystem 100 of FIG. 1.

3D encoder 420 may include one or more analog-to-digital converters, and may also include digital logic to encode information from 3D sensor 416 into 3D scene information 456. In some examples, this may be a low-polygon representation that can be used for verification and for other purposes. However, detailed, high-resolution scans could also be used.

3D information encoder 420 yields a 3D scene data stream 452. In this example, 3D scene data stream 452 includes two examples of 3D scene information 456, 460.

3D scene information 456 may be different from 3D scene information 460, in that the 3D scene information may have changed between the two scans. Each example of 3D scene information may be associated with a respective i-frame 448, 449. For example, in this case, 3D scene information 456 is aligned with i-frame 448, while 3D scene information 460 is aligned with i-frame 449. This alignment may be realized, for example, via metadata similar to those used to align audio tracks to video tracks. In other cases, 3D scene information 456, 460 may carry tags, such as timestamps that can be used to correlate them to i-frame 448 and i-frame 449 respectively.

In this case, one segment of 3D scene information is provided per i-frame. In other embodiments, one instance of 3D scene information may be provided for every n i-frames, where n>1. Furthermore, it is not necessary in every embodiment to align 3D scene information with i-frames. The 3D scene information may be provided at other regular or irregular intervals, based on substantial changes (i.e., the delta between one frame and another is above a threshold, and a new 3D scene is scanned), or at any other suitable spacing. In cases where the background remains substantially constant, a video may have only one single frame of 3D scene information. In each of these embodiments, suitable data or metadata may be provided to align the 3D scene information with the 2D video. This alignment can be useful in analysis of the video, such as when an ML algorithm is comparing the 3D scene information to see if it appears consistent with the 2D video.

In some cases, 3D scene data stream 452 may be provided as a separate digital data track from 2D video stream 444. Many video encoding technologies already include the ability to provide separate, time-synchronized tracks, such as audio and other data streams 464. These could include audio data, closed captioning, navigation aids, and other information that can be digitally synchronized with 2D video stream 444. Thus, in some cases, 3D scene data stream 452 may be included as a separate data track from 2D video stream 444, and may be synchronized.

In other cases, 3D scene data stream 452 may include information that is integrated directly into 2D video stream 444. In this example, interstitial 3D data frames may be encoded as individual frames into 2D video stream 444. These could be included, for example, at scene transitions, or at other points where the inclusion of a frame that does not render properly as an image would be minimally distracting. Furthermore, with large frame rates, a single scene that does not render correctly may be minimally visible. Thus, it is possible to provide 3D scene information either as a separate data track, or integrated into the 2D video stream. In the case of integrating 3D scene information into the 2D video stream, a novel video codec may be provided that includes a frame header that identifies the frame as a 3D scene data frame that should not be rendered, and that can be ignored by the codec.

Camera 404 also includes a security module 424 that provides digital signature generation. Security module 424 may include a private key 428. Private key 428 may be a hardware encoded private key that is not readable outside of camera 404, at least not without destructive means, such as the use of a scanning electron microscope or tunneling electron microscope. A hardware encoded private key can be used with a signature generation block 432. Signature generation block 432 can, for example, hash digital video 440 to provide a digital signature of digital video 440. That digital signature can then be cryptographically signed with private key 428 to make the digital signature secure. Thus, a later investigator can verify that digital video 440 was, indeed, recorded by camera 404, and has not been altered since it was recorded.

In some cases, real video digital signature 468 may include other verification information. For example, digital signature 468 could include a key that uniquely identifies camera 404. This can allow digital video 440 to be traced back to camera 404. In some cases, this could be publicly available data, so that any video can be traced back to its original source camera or device. In other cases, particularly in cases where there is fear of retribution, it may be desirable for the videographer to maintain some degree of anonymity. In that case, digital signature 468 may include a signature with, for example, a one-way hash. This one-way hash can be re-created by camera 404 using private key 428, if desired for authentication purposes. However, the one-way hash cannot be used to reverse-engineer the identity of camera 404. In this case, a person wishing to prove that digital video 440 was produced by camera 404 can use a function of camera 404 to reproduce the one-way hash and provide the desired proof. However, a bad actor seeking retribution on the videographer cannot use the one-way hash to identify camera 404 without participation of the owner of the camera, itself.

In other cases, digital signature 468 may also include other information that may be useful in verifying the video. For example, even though the digital signature may include a one-way hash that cannot be used to track down the specific camera used, it may include cryptographically verified make and/or model information for camera 404. The make or model number could at least be used to verify the characteristics of the type of camera used.

For example, digital signature 468 may include a make and model number for camera 404. Camera 404 may have a user-selectable option to optionally include 3D scene data stream 452 with digital video 440. If the videographer is producing a deep fake video, then the videographer may simply turn this feature off, and still provide a digital signature 468.

In some cases, camera 404 may provide an enforcement mechanism such as not providing a digital signature 468 unless 3D scene data stream 452 is included. However, this is not always desirable. There may be legitimate reasons not to include the 3D data stream, such as to save storage space, and/or to produce a video that is backward-compatible with video codecs that cannot read the 3D scene data stream.

In that case, an investigator may use information within digital signature 468 to identify the make and model of camera 404. The investigator could consult a model database to determine whether camera 404 had 3D scene capability. If that capability was present with camera 404 and is not included in the video file, then the investigator may at least deem this to be suspicious, and may take appropriate steps. For example, a video sharing site could provide a badge mechanism wherein videos are given badges based on their apparent validity. A video that is uploaded with a valid digital signature and with 3D scene information may be analyzed by a machine learning model or a human investigator to verify that the 3D scene data match, and if they do, then the video may be given a "green" badge. If the video is signed, but lacks 3D scene information, it may be given a "yellow" badge. If the video is unsigned, or if it has mismatched 3D scene data, it may be given an "orange" badge. If the video is a known deep fake, then it could be given a "red" badge.

In some cases, information about the ability of camera 404 could be provided directly within digital signature 468. For example, digital signature 468 could include a flag or other field that indicates whether camera 404 has 3D scene information capability. This could then be used to determine directly whether 3D scene data should be available for trust purposes.

Figure 5:
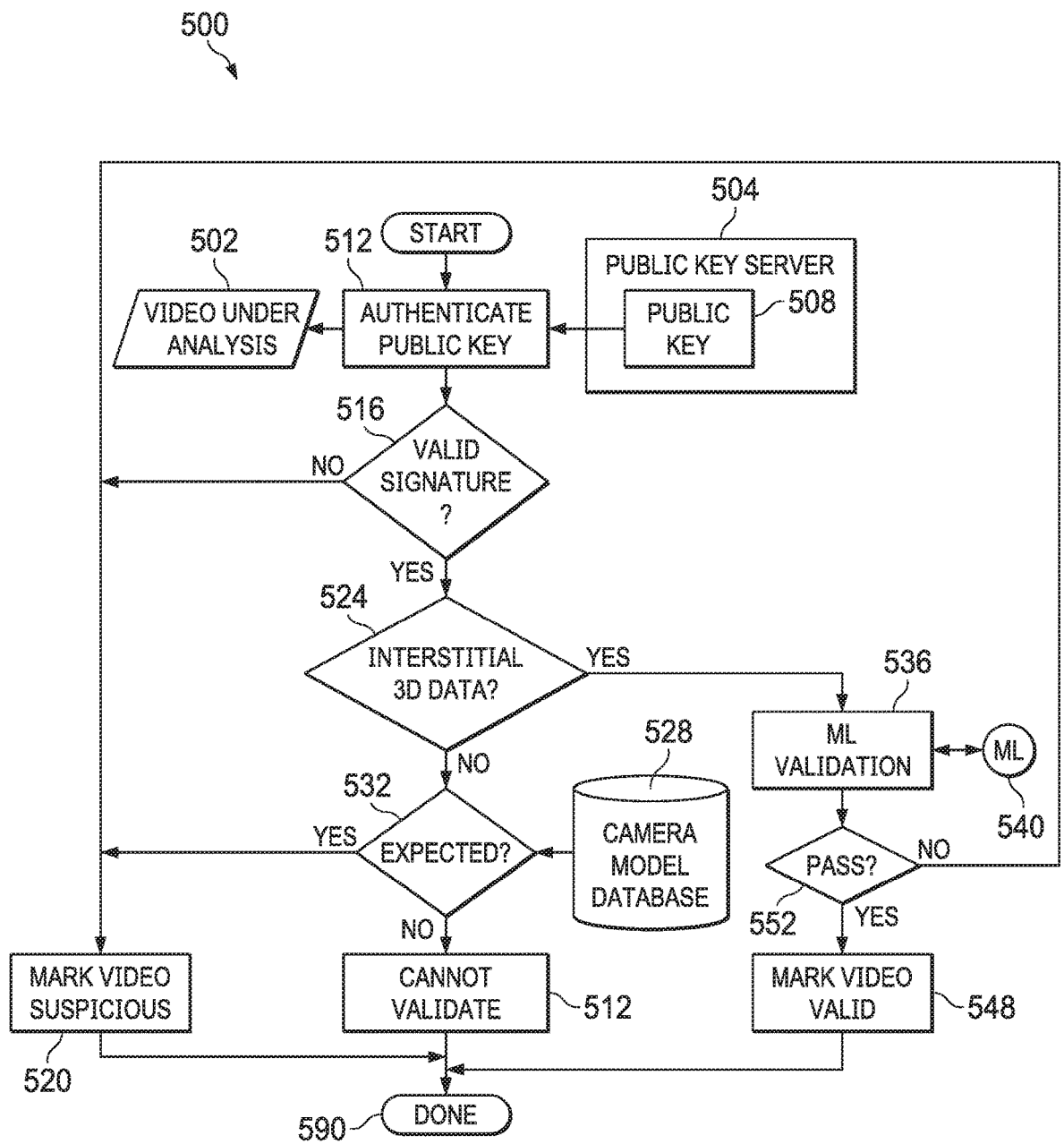
FIG. 5 is a flowchart of a method for validating a video.

FIG. 5 is a flowchart of a method 500 for validating a video. Method 500 could be implemented, for example, as an operational agent 708 within hardware platform 700 of FIG. 7. This operational agent could be referred to as a validation engine, and could include, by way of illustrative and nonlimiting example, executable instructions encoded on a volatile or non-volatile memory medium. It could also include hardware and/or firmware, such as special-purpose accelerator chips, with firmware encoding to perform validation, and/or computer instructions or microcode.

Starting in block 512, the analysis computer may receive a video under analysis 502. Video under analysis 502 may include a public key 508, and a cryptographic signature with information such as a hash of the video, and other validating information. The system may query a public key server 504 for public key 508. This can ensure that public key 508 is valid and was issued, for example, by a trusted certificate authority.

In decision block 516, the system determines whether a valid signature was provided. If a valid signature was not provided, then in block 520, the video may be marked as suspicious, or otherwise as untrusted.

Returning to decision block 516, if a valid signature was provided, then in decision block 524, the system may analyze video under analysis 502 to determine whether interstitial 3D data are available.

If interstitial 3D data are available, then in block 536, validation may occur. In a very simple validation, a human user may manually compare the 3D scene data to the video frames to observe whether they appear to match. In another simple example, a human user or a computer algorithm could check whether the 3D scene information is simply a flat panel. This would indicate the suspicious use of a recording from a flat display. If a very simple validation of this type is not available, or is not desirable, then in some cases a machine learning model 540 may be used for a more detailed analysis. Machine learning model 540 may be trained on a training set of both valid and invalid videos with associated 3D scene information. In most cases, for valid videos, the 3D scene information will match the 2D scene data, while for invalid cases, the 3D scene information will mismatch. Thus, machine learning model 540 can be trained to draw correlations between 2D images and associated expected 3D objects that correlate with them. In those cases, machine learning model 540 can be used for machine learning validation 536. This validation can be used to ensure that the 3D scene data match, and that the encrypted and signed video is valid.

In decision block 552, if the video passes the validation test, then in block 548, the video may be marked as valid.

Returning to decision block 552, if the video does not pass the machine learning validation test, then in block 520, the video may be marked as suspicious.

Returning to decision block 524, if there are no interstitial 3D data, then in decision block 532, the system determines whether this video is expected to have interstitial 3D scene data. For example, the system may query a header or other information in video under analysis 502 to identify a make and model of the original recording device, and optionally, to determine whether a flag or field indicates that the device had the ability to record 3D scene data. In some cases, the system could also camera query model database 528 to identify models with such a capability.

If the video is expected to have 3D scene data and does not have it, then in block 520, the video may be marked as suspicious.

Returning to decision block 532, if the interstitial 3D scene data are not expected (for example, if the video was filmed on a camera with the ability to digitally sign and certify the video, but without the ability to produce interstitial 3D scene data), then in block 512, the video cannot be validated.

As discussed above, whether the video is marked "valid" in block 548, "suspicious" in block 520, or "cannot validate" in block 512, appropriate action may be taken, and appropriate trust levels may be applied to the video for various purposes.

In block 590, the method is done.

Figure 6:
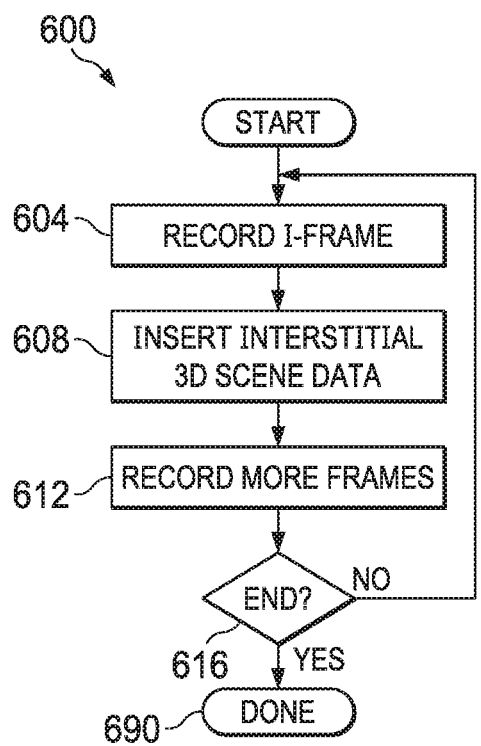
FIG. 6 is a flowchart of a method of producing a video with interstitial 3D scene data.

FIG. 6 is a flowchart of a method 600 of producing a video with interstitial 3D scene data. Method 600 may be practiced, for example, by camera 404 operating both 2D video encoder 412 and 3D video encoder 420. This could include instructions stored on a volatile or non-volatile memory within the camera, and executed by an embedded processor within the camera. It could also include appropriate hardware, firmware, hardware instructions, microcode, or similar.

Method 600 illustrates an embodiment in which an instance of 3D scene data is recorded for each i-frame. In other cases, other embodiments may be used, such as inserting 3D scene information for every frame, or inserting 3D scene information at other intervals, as discussed above.

In block 604, the camera records the i-frame, or some other keyframe, including full 2D scene information for the frame.

In block 608, the camera operates the 3D scanner to create 3D scene data for the scene, and encodes this as a 3D scene data frame. In some examples, the 3D scene data frame may be inserted into a separate data track, and may include synchronization data to synchronize the 3D scene data frame with the keyframe or i-frame.

In block 612, the camera records more frames. In some cases these may be, for example, p-frames or b-frames, and may not include 3D scene information.

In decision block 616, if the video is not done, then control returns to block 604 and more frames are recorded.

Returning to decision block 616, if the video has come to an end, then in block 690, the method is done.

Figure 7:
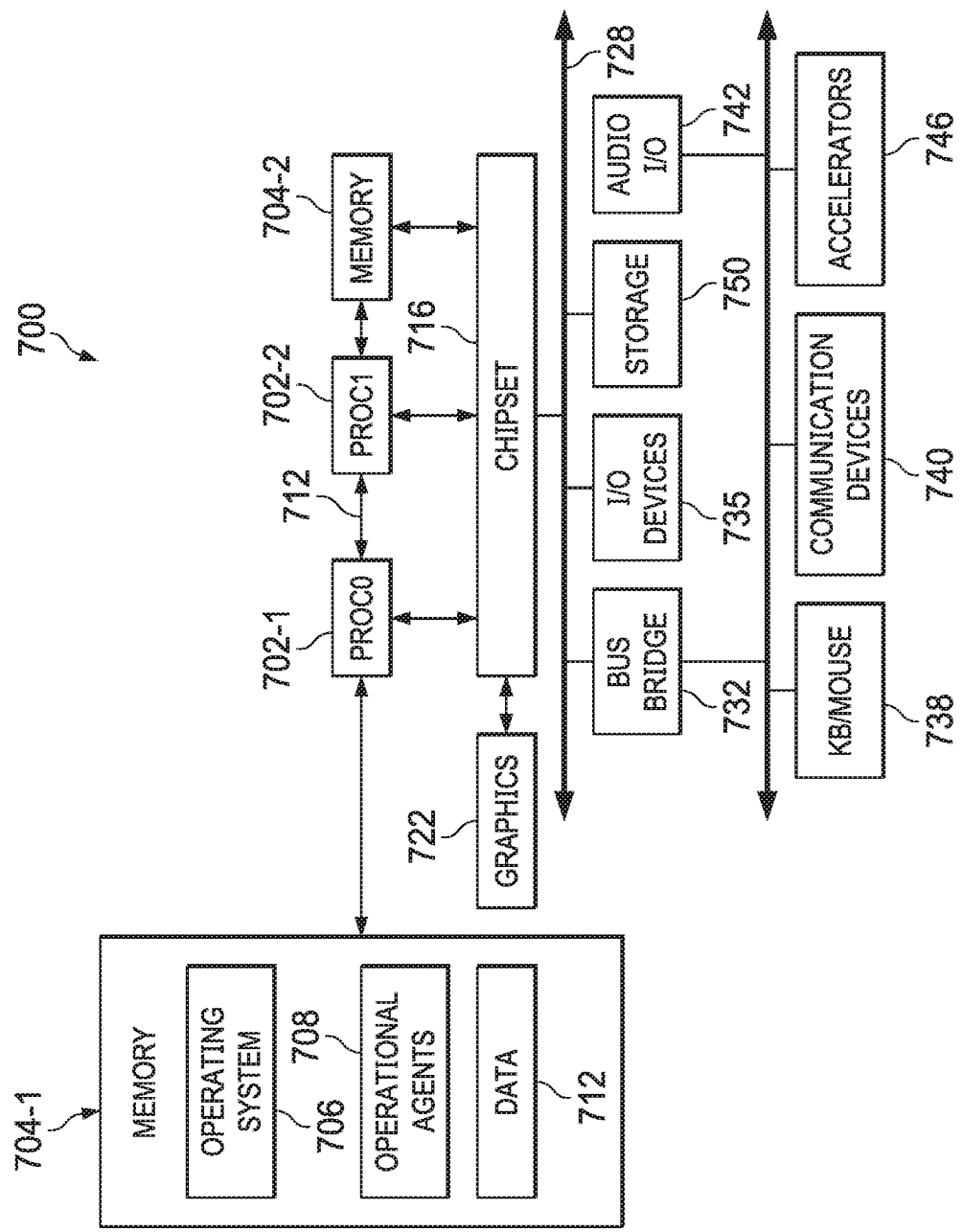
FIG. 7 is a block diagram of selected elements of a hardware platform.

FIG. 7 is a block diagram of a hardware platform 700. In at least some embodiments, hardware platform 700 may be configured or adapted to provide validation of interstitial 3D scene information in video streams, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Figure 9:
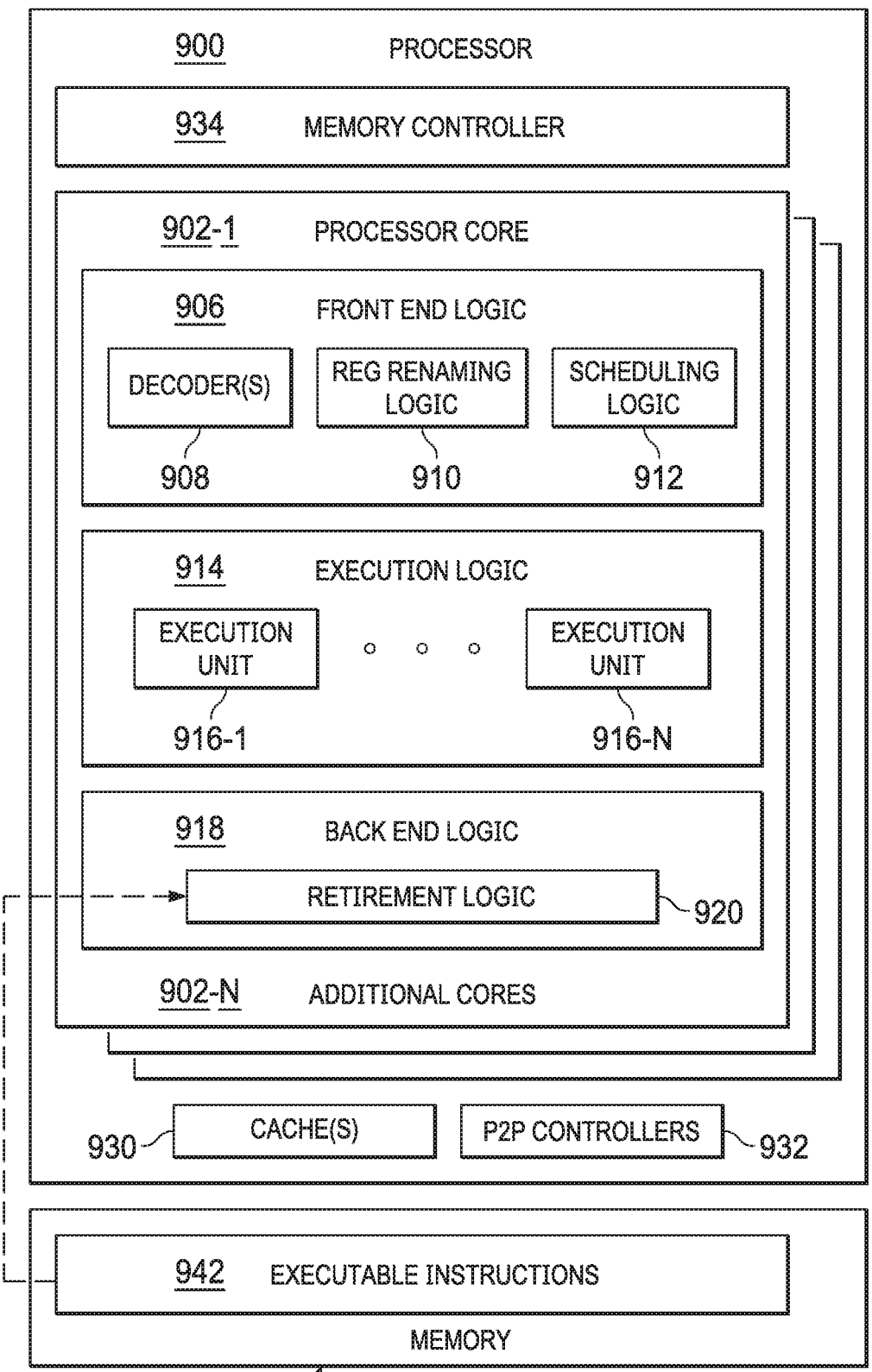
FIG. 9 is a block diagram of selected elements of a processor.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE, but one embodiment is illustrated in FIG. 9. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more central processor units (CPUs).

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 710 via a bus. For example, some memories may be connected via a system bus, or in a data center, memory may be accessible in a remote DMA (RDMA) configuration.

Memory 704 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency, non-volatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high-definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various universal serial bus (USB), FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, a data storage device 744, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 710 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 8:
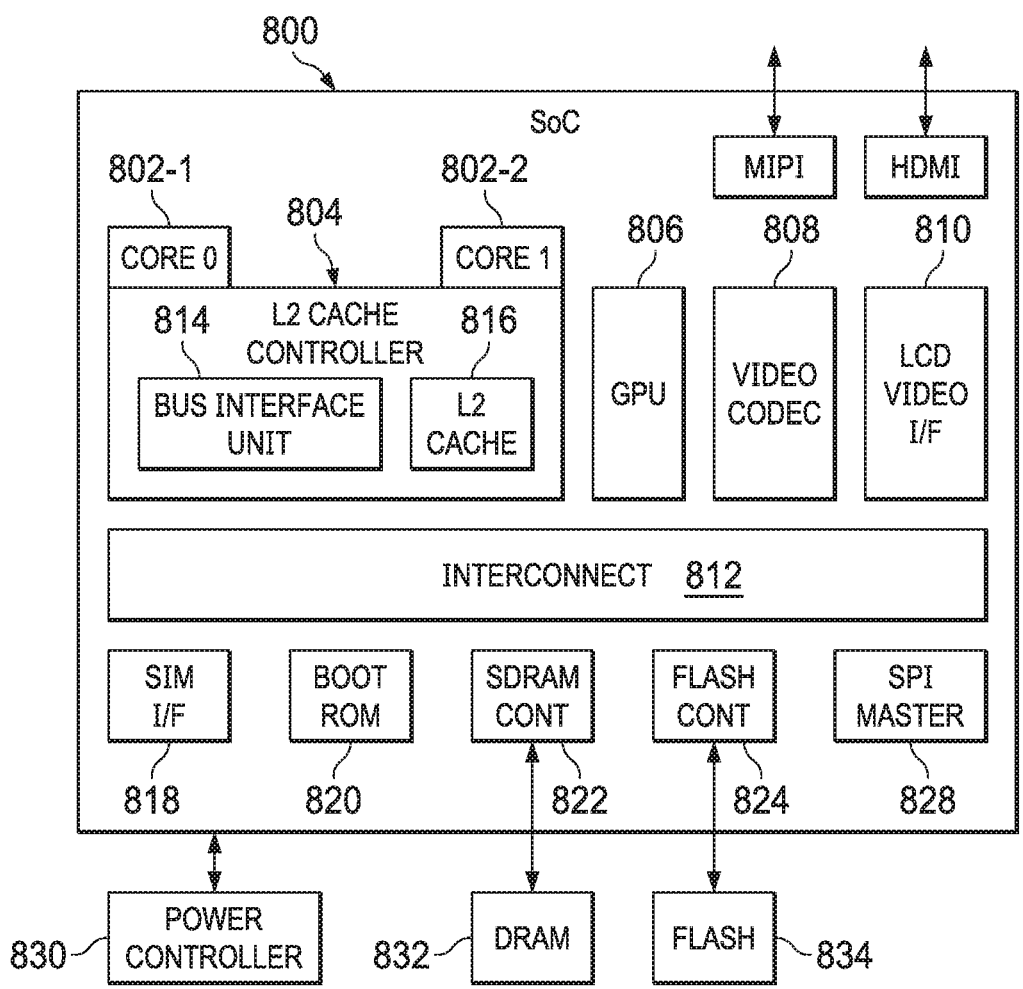
FIG. 8 is a block diagram of selected elements of a system-on-a-chip (SoC).

FIG. 8 is a block illustrating selected elements of an example SoC 800. In at least some embodiments, SoC 800 may be configured or adapted to provide validation of interstitial 3D scene information in video streams, according to the teachings of the present specification.

At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a PC, server, video processing components, laptop computer, notebook computer, netbook, or touch-enabled device.

As with hardware platform 700 above, SoC 800 may include multiple cores 802-1 and 802-2. In this illustrative example, SoC 800 also includes an L2 cache control 804, a GPU 806, a video codec 808, a liquid crystal display (LCD) I/F 810 and an interconnect 812. L2 cache control 804 can include a bus interface unit 814, and an L2 cache 816. Liquid crystal display (LCD) I/F 810 may be associated with mobile industry processor interface (MIPI)/HDMI links that couple to an LCD.

SoC 800 may also include a subscriber identity module (SIM) I/F 818, a boot ROM 820, a synchronous dynamic random access memory (SDRAM) controller 822, a flash controller 824, a serial peripheral interface (SPI) master 828, a suitable power control 830, a dynamic RAM (DRAM) 832, and flash 834.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 9 is a block diagram illustrating selected elements of a processor 900. In at least some embodiments, processor 900 may be configured or adapted to provide validation of interstitial 3D scene information in video streams, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 900 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 900 includes one or more processor cores 902, including core 902-1-902-N. Cores 902 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 900 may include at least one shared cache 930, which may be treated logically as part of memory 940. Memory 940 may include executable instructions 942, as illustrated. Caches 930 may be filled according to known caching techniques, and may store instructions and/or data that may be used by one or more components of processor 900.

Processor 900 may include an integrated memory controller (MC) 934, to communicate with memory 940. Memory controller 934 may include logic and circuitry to interface with memory 940, and may also include a cache controller to handle filling and evicting instructions and data to and from cache 930.

By way of example, each core 902 may include front-end logic 906, execution logic 914, and backend logic 918.

In the illustrated embodiment, front-end logic 906 includes an instruction decoder or decoders 908, register renaming logic 910, and scheduling logic 912. Decoder 908 may decode instructions received. Register renaming logic 910 may provide register renaming, for example to facilitate pipelining. Scheduling logic 912 may schedule instruction execution, and may provide out-of-order (ooo) execution. Front-end logic 906 may fetch incoming instructions, perform various processing (e.g., caching, decoding, branch predicting, etc.), and pass instructions to execution logic 914.

Execution logic 914 includes one or more execution units 916-1-916-N. Execution units 916 may include hardware instructions and microcode to carry out the provided instructions.

Backend logic 918 includes retirement logic 920. Core 902 may provide for speculative execution of instructions, branch prediction, and similar. Retirement logic 920 may be configured to determine which predicted instructions were actually needed by the program flow.

Processor 900 may also include a PtP controller 932, which enables connection to an uncore, chipset, Northbridge, Southbridge, or bus, by way of example.

Figure 10:
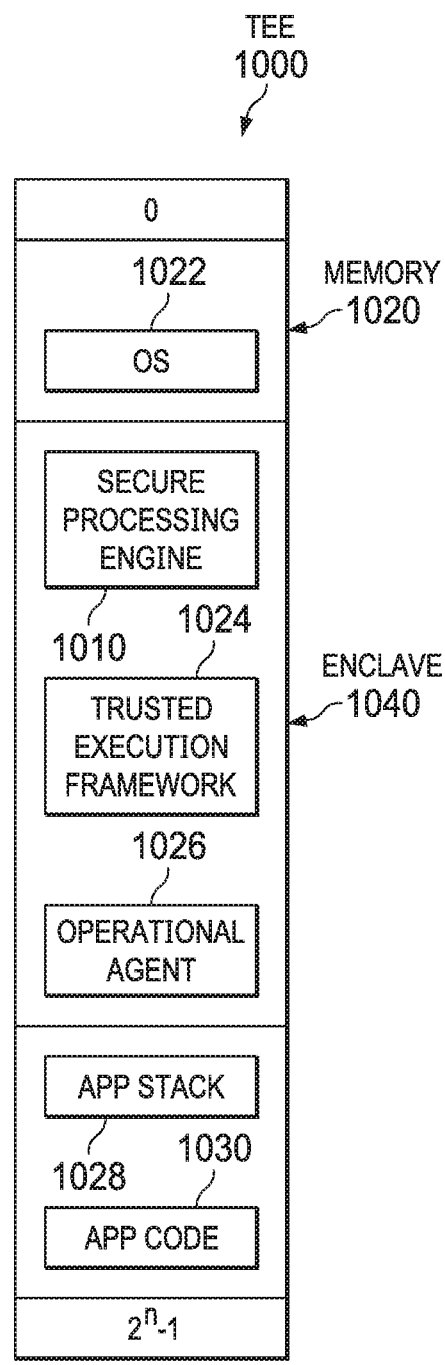
FIG. 10 is a block diagram of selected elements of a trusted execution environment (TEE).

FIG. 10 is a block diagram of a trusted execution environment (TEE) 1000. In at least some embodiments, one or both of a digital video camera and a validation server could include a TEE, which may be used to cryptographically sign and verify videos, including videos with interstitial 3D scene information.

In the example of FIG. 10, memory 1020 is addressable by n-bits, ranging in address from 0 to $2^n-1$ (note, however, that in many cases, the size of the address space may far exceed the actual memory available). Within memory 1020 is an OS 1022, enclave 1040, application stack 1020, and application code 1030.

In this example, enclave 1040 is a specially-designated portion of memory 1020 that cannot be entered into or exited from except via special instructions, such as Intel Software Guard Extensions (SGX) or similar. Enclave 1040 is provided as an example of a secure environment which, in conjunction with a secure processing engine 1010, forms a TEE 1000 on a hardware platform such as platform 700 of FIG. 7. A TEE 1000 is a combination of hardware, software, and/or memory allocation that provides the ability to securely execute instructions without interference from outside processes, in a verifiable way. By way of example, TEE 1000 may include memory enclave 1040 or some other protected memory area, and a secure processing engine 1010, which includes hardware, software, and instructions for accessing and operating on enclave 1040. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1010 may be a user-mode application that operates via trusted execution framework 1024 within enclave 1040. TEE 1000 may also conceptually include processor instructions that secure processing engine 1010 and trusted execution framework 1024 require to operate within enclave 1040.

Secure processing engine 1010 and trusted execution framework 1024 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1022 may be excluded from TCB, in addition to the operation agent 1026, regular application stack 1028, and application code 1030.

In certain systems, computing devices equipped with Intel SGX or equivalent instructions may be capable of providing an enclave 1040. It should be noted, however, that many other examples of TEEs are available, and TEE 1000 is provided only as one example thereof. Other secure environments may include, by way of nonlimiting example, a virtual machine, sandbox, testbed, test machine, or other similar device or method for providing a TEE 1000.

In an example, enclave 1040 provides a protected memory area that cannot be accessed or manipulated by ordinary computer instructions. Enclave 1040 is described with particular reference to an Intel SGX enclave by way of example, but it is intended that enclave 1040 encompass any secure processing area with suitable properties, regardless of whether it is called an "enclave."

One feature of an enclave is that once an enclave region 1040 of memory 1020 is defined, as illustrated, a program pointer cannot enter or exit enclave 1040 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1040.

Thus, once enclave 1040 is defined in memory 704, a program executing within enclave 1040 may be safely verified to not operate outside of its bounds. This security feature means that secure processing engine 1010 is verifiably local to enclave 1040. Thus, when an untrusted packet provides its content to be rendered with trusted execution framework 1024 of enclave 1040, the result of the rendering is verified as secure.

Enclave 1040 may also digitally sign its output, which provides a verifiable means of ensuring that content has not been tampered with or modified since being rendered by secure processing engine 1010. A digital signature provided by enclave 1040 is unique to enclave 1040 and is unique to the hardware of the device hosting enclave 1040.

Figure 11:
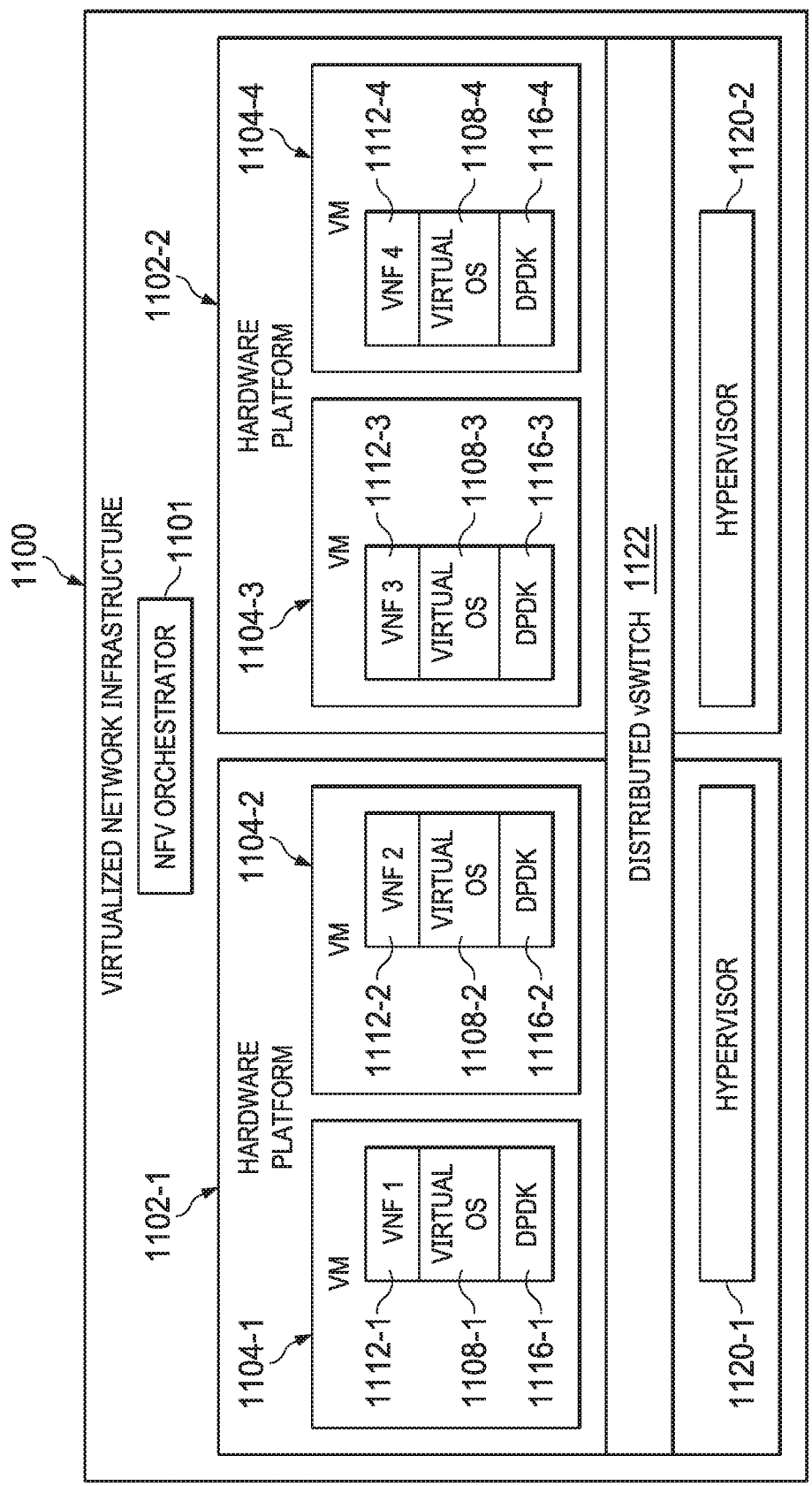
FIG. 11 is a block diagram of selected elements of a network function virtualization (NFV) infrastructure.

FIG. 11 is a block diagram of a network function virtualization (NFV) infrastructure 1100. In at least some embodiments, NFV may be used to provide a validation server to verify videos, including videos with interstitial 3D scene information.

NFV is an aspect of network virtualization that is generally considered distinct from, but that can still interoperate with, a software defined network (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

The following examples are provided by way of illustration.

Example 1 includes a digital video camera, comprising: an analog picture element; an analog-to-digital converter (ADC) to digitize input from the analog picture element; a three-dimensional (3D) scanner; compiling logic to compile the digitized input into a video stream; and insertion logic to insert interstitial 3D scene data into the video stream.

Example 2 includes the digital video camera of example 1, further comprising a security module to assign an electronic digital signature to the video stream.

Example 3 includes the digital video camera of example 2, wherein the security module comprises a private encryption key.

Example 4 includes the digital video camera of example 3, wherein the private encryption key is hardware encoded.

Example 5 includes the digital video camera of example 2, wherein the security module uses a one-directional cryptographic hash.

Example 6 includes the digital video camera of example 2, wherein the security module is to encode a manufacturer identifier into the electronic digital signature.

Example 7 includes the digital video camera of example 2, wherein the security module is to encode a model identifier into the electronic digital signature.

Example 8 includes the digital video camera of example 1, wherein the compiling logic is to compress the video stream, including the use of key frames.

Example 9 includes the digital video camera of example 8, wherein the insertion logic is to insert 3D scene information for each key frame.

Example 10 includes the digital video camera of example 1, wherein the insertion logic is to insert interstitial 3D scene information every nth video frame, wherein n>1.

Example 11 includes the digital video camera of example 10, wherein n is a whole number.

Example 12 includes the digital video camera of example 1, wherein the insertion logic is to insert interstitial 3D scene information at regular time intervals.

Example 13 includes the digital video camera of example 1, wherein the insertion logic is to insert interstitial 3D scene information at random time intervals.

Example 14 includes the digital video camera of example 1, wherein the interstitial 3D scene information comprises a low-polygon 3D model Example 15 includes the digital video camera of example 1, wherein the 3D scanner comprises a low intensity laser.

Example 16 includes the digital video camera of example 1, wherein the insertion logic is to encode the interstitial 3D scene in formation on a separate data track from the video stream.

Example 17 includes a method of filming a motion picture of a scene with interstitial three-dimensional (3D) scene information, comprising: receiving two-dimensional (2D) analog input information from the scene; digitizing the 2D analog input information; compiling the digitized 2D analog input information into a 2D video stream; scanning the scene for 3D scene data; and inserting the 3D scene data into the 2D video stream.

Example 18 includes the method of example 17, further comprising assigning an electronic digital signature to the 2D video stream.

Example 19 includes the method of example 18, wherein assigning the electronic digital signature comprises using a private encryption key.

Example 20 includes the method of example 18, wherein the private encryption key is hardware encoded.

Example 21 includes the method of example 18, wherein assigning the electronic digital signature comprises using a one-directional cryptographic hash.

Example 22 includes the method of example 18, wherein assigning the electronic digital signature comprises encoding a manufacturer identifier into the electronic digital signature.

Example 23 includes the method of example 18, wherein assigning the electronic digital signature comprises encoding a model identifier into the electronic digital signature.

Example 24 includes the method of example 17, wherein compiling the digitized 2D analog input further comprises compressing the video stream, including the use of key frames.

Example 25 includes the method of example 24, wherein inserting the 3D scene data further comprises inserting 3D scene information for each key frame.

Example 26 includes the method of example 17, wherein inserting the 3D scene data further comprises inserting interstitial 3D scene information every nth video frame, wherein n>1.

Example 27 includes the method of example 26, wherein n is a whole number.

Example 28 includes the method of example 18, wherein inserting the 3D scene data further comprises inserting interstitial 3D scene information at regular time intervals.

Example 29 includes the method of example 17, wherein inserting the 3D scene data further comprises inserting interstitial 3D scene information at random time intervals.

Example 30 includes the method of example 17, wherein the interstitial 3D scene information comprises a low-polygon 3D model Example 31 includes the method of example 17, wherein scanning the scene for 3D scene data comprises scanning with a low intensity laser.

Example 32 includes the method of example 17, wherein inserting the 3D scene data further comprises encoding the interstitial 3D scene information on a separate data track from the 2D video stream.

Example 33 includes an apparatus comprising means for performing the method of any of examples 17-32.

Example 34 includes the apparatus of example 33, wherein the means for performing the method comprise a processor and a memory.

Example 35 includes the apparatus of example 34, wherein the memory comprises machine-readable instructions that, when executed, cause the apparatus to perform the method of any of examples 17-32.

Example 36 includes the apparatus of any of examples 33-35, wherein the apparatus is a computing system.

Example 37 includes at least one computer-readable medium comprising instructions that, when executed, implement a method or realize an apparatus as illustrated in any of examples 17-36.

Example 38 includes a video analyzer to detect deep fake videos, comprising: a hardware platform comprising a processor and a memory; and a validation engine comprising instructions encoded within the memory to instruct the processor to: receive a video for analysis, the video including a cryptographic signature; validate the cryptographic signature; identify three-dimensional (3D) scene data encoded within the video; and assign the video a reputation for authenticity according to the 3D scene data.

Example 39 includes the video analyzer of example 38, wherein the 3D scene data are interstitial 3D scene data.

Example 40 includes the video analyzer of example 38, wherein the instructions are to assign the video a suspicious reputation if validating the cryptographic signature fails.

Example 41 includes the video analyzer of example 38, wherein validating the cryptographic signature comprises querying a trusted third-party signature authority.

Example 42 includes the video analyzer of example 38, wherein validating the cryptographic signature comprises computing a make identifier from the cryptographic signature.

Example 43 includes the video analyzer of example 38, wherein validating the cryptographic signature comprises computing a model identifier from the cryptographic signature.

Example 44 includes the video analyzer of example 43, wherein assigning the reputation further comprises querying a model database to determine whether the model has 3D scene data capability.

Example 45 includes the video analyzer of example 44, wherein assigning the reputation further comprises determining that the model includes 3D scene data capability, and assigning a suspicious reputation if the 3D scene data are missing or unverifiable.

Example 46 includes the video analyzer of example 43, wherein assigning the reputation further comprises extracting from a header a 3D scene capability for the model, and assigning a suspicious reputation if the 3D scene data are missing or unverifiable Example 47 includes the video analyzer of example 43, wherein assigning the reputation comprises determining that the model identifier is for a model with interstitial 3D scene data capability, determining that the video lacks 3D scene data, and assigning the video a suspicious or unverified reputation.

Example 48 includes the video analyzer of example 38, wherein validating the cryptographic signature comprises cryptographically verifying a key received from a device purported to have recorded the video.

Example 49 includes the video analyzer of example 38, wherein assigning the video the reputation for authenticity comprises verifying that the 3D scene data are not flat.

Example 50 includes the video analyzer of example 38, wherein assigning the video the reputation for authenticity comprises verifying that the 3D scene data are substantially consistent with 2D scene data within the video.

Example 51 includes the video analyzer of example 38, wherein assigning the video the reputation for authenticity comprises applying a machine learning (ML) model to analyze the 3D scene data.

Example 52 includes one or more tangible, non-transitory computer-readable storage media having stored thereon executable instructions to: receive a mixed-dimensional video for analysis, the video including a two-dimensional (2D) visible video stream, non-visible interstitial three-dimensional (3D) scene information, and a cryptographic signature; validate the cryptographic signature; and assign the video a reputation for authenticity according to the 3D scene data.

Example 53 includes the one or more tangible, non-transitory computer-readable storage media of example 52, wherein the 3D scene data are interstitial 3D scene data.

Example 54 includes the one or more tangible, non-transitory computer-readable storage media of example 52, wherein the instructions are to assign the video a suspicious reputation if validating the cryptographic signature fails.

Example 55 includes the one or more tangible, non-transitory computer-readable storage media of example 52, wherein validating the cryptographic signature comprises querying a trusted third-party signature authority.

Example 56 includes the one or more tangible, non-transitory computer-readable storage media of example 52, wherein validating the cryptographic signature comprises computing a make identifier from the cryptographic signature.

Example 57 includes the one or more tangible, non-transitory computer-readable storage media of example 52, wherein validating the cryptographic signature comprises computing a model identifier from the cryptographic signature.

Example 58 includes the one or more tangible, non-transitory computer-readable storage media of example 57, wherein assigning the reputation further comprises querying a model database to determine whether the model has 3D scene data capability.

Example 59 includes the one or more tangible, non-transitory computer-readable storage media of example 57, wherein assigning the reputation further comprises determining that the model includes 3D scene data capability, and assigning a suspicious reputation if the 3D scene data are missing or unverifiable.

Example 60 includes the one or more tangible, non-transitory computer-readable storage media of example 57, wherein assigning the reputation further comprises extracting from a header a 3D scene capability for the model, and assigning a suspicious reputation if the 3D scene data are missing or unverifiable Example 61 includes the one or more tangible, non-transitory computer-readable storage media of example 57, wherein assigning the reputation comprises determining that the model identifier is for a model with interstitial 3D scene data capability, determining that the video lacks 3D scene data, and assigning the video a suspicious or unverified reputation.

Example 62 includes the one or more tangible, non-transitory computer-readable storage media of example 52, wherein validating the cryptographic signature comprises cryptographically verifying a key received from a device purported to have recorded the video.

Example 63 includes the one or more tangible, non-transitory computer-readable storage media of example 52, wherein assigning the video the reputation for authenticity comprises verifying that the 3D scene data are not flat.

Example 64 includes the one or more tangible, non-transitory computer-readable storage media of example 52, wherein assigning the video the reputation for authenticity comprises verifying that the 3D scene data are substantially consistent with 2D scene data within the video.

Example 65 includes the one or more tangible, non-transitory computer-readable storage media of example 52, wherein assigning the video the reputation for authenticity comprises applying an ML model to analyze the 3D scene data.

Example 66 includes a computer-implemented method of analyzing a video, comprising: separating visible two-dimensional (2D) video of a first data track from interstitial three-dimensional (3D) scene data of a second data track; analyzing the 3D scene data for consistency; cryptographically validating a digital signature associated with the video; and assigning the video a reputation for authenticity according to the analyzing and the validating.

Example 67 includes the method of example 66, further comprising assigning the video a suspicious reputation if validating the cryptographic signature fails.

Example 68 includes the method of example 66, wherein cryptographically validating the digital signature comprises querying a trusted third-party signature authority.

Example 69 includes the method of example 66, wherein cryptographically validating the digital signature comprises computing a make identifier from the cryptographic signature.

Example 70 includes the method of example 66, wherein cryptographically validating the digital signature comprises computing a model identifier from the cryptographic signature.

Example 71 includes the method of example 66, wherein assigning the reputation further comprises querying a model database to determine whether the model has 3D scene data capability.

Example 72 includes the method of example 71, wherein assigning the reputation further comprises determining that the model includes 3D scene data capability, and assigning a suspicious reputation if the 3D scene data are missing or unverifiable.

Example 73 includes the method of example 71, wherein assigning the reputation further comprises extracting from a header a 3D scene capability for the model, and assigning a suspicious reputation if the 3D scene data are missing or unverifiable Example 74 includes the method of example 71, wherein assigning the reputation comprises determining that the model identifier is for a model with interstitial 3D scene data capability, determining that the video lacks 3D scene data, and assigning the video a suspicious or unverified reputation.

Example 75 includes the method of example 66, wherein cryptographically validating the digital signature comprises verifying a key received from a device purported to have recorded the video.

Example 76 includes the method of example 66, wherein assigning the video the reputation for authenticity comprises verifying that the 3D scene data are not flat.

Example 77 includes the method of example 66, wherein assigning the video the reputation for authenticity comprises verifying that the 3D scene data are substantially consistent with 2D scene data within the video.

Example 78 includes the method of example 66, wherein assigning the video the reputation for authenticity comprises applying an ML model to analyze the 3D scene data.

Example 79 includes an apparatus comprising means for performing the method of any of examples 66-78.

Example 80 includes the apparatus of example 79, wherein the means for performing the method comprise a processor and a memory.

Example 81 includes the apparatus of example 80, wherein the memory comprises machine-readable instructions that, when executed, cause the apparatus to perform the method of any of examples 66-78.

Example 82 includes the apparatus of any of examples 79-81, wherein the apparatus is a computing system.

Example 83 includes at least one computer-readable medium comprising instructions that, when executed, implement a method or realize an apparatus as illustrated in any of examples 66-82.

What is claimed is:

1. A digital video camera, comprising:
   an analog picture element;
   an analog-to-digital converter (ADC) to digitize input from the analog picture element;
   a three-dimensional (3D) scanner; and
   circuitry, including hardware and/or software-encoded instructions to:
   compile the digitized input into a video stream, the video stream comprising a plurality of key frames; and
   insert interstitial 3D scene data frames into the video stream, the 3D scene data frames associated with respective key frames, and including 3D scene data that match the respective key frames; and
   sign the video stream with a hardware key unique to the digital video camera.

2. The digital video camera of claim 1, further comprising a security module to assign an electronic digital signature to the video stream.

3. The digital video camera of claim 2, wherein the security module comprises a private encryption key.

4. The digital video camera of claim 3, wherein the private encryption key is hardware encoded.

5. The digital video camera of claim 2, wherein the security module uses a one-directional cryptographic hash.

6. The digital video camera of claim 2, wherein the security module is to encode a manufacturer identifier into the electronic digital signature.

7. The digital video camera of claim 2, wherein the security module is to encode a model identifier into the electronic digital signature.

8. The digital video camera of claim 1, wherein the instructions are further to compress the video stream, including the use of key frames.

9. The digital video camera of claim 8, wherein the instructions are further to insert 3D scene information for each key frame.

10. The digital video camera of claim 1, wherein the instructions are further to insert interstitial 3D scene information every nth video frame, wherein n>1.

11. The digital video camera of claim 10, wherein n is a whole number.

12. The digital video camera of claim 1, wherein the instructions are further to insert interstitial 3D scene information at regular time intervals.

13. The digital video camera of claim 12, wherein the interstitial 3D scene information comprises a low-polygon 3D model.

14. A video analyzer to detect deep fake videos, comprising:
   a hardware platform comprising a processor and a memory; and
   a validation engine comprising instructions encoded within the memory to instruct the processor to:
   receive a video for analysis, the video including a cryptographic signature and a plurality of key frames;
   validate the cryptographic signature;
   identify three-dimensional (3D) scene data frames encoded within the video, the 3D scene data frames associated with respective key frames, and including 3D scene data that match the respective key frames;
   validate a signature of the video using a key derived from a unique hardware key of a source video camera of the video; and
   assign the video a reputation for authenticity according to the 3D scene data.

15. The video analyzer of claim 14, wherein the 3D scene data are interstitial 3D scene data.

16. The video analyzer of claim 14, wherein the instructions are to assign the video a suspicious reputation if validating the cryptographic signature fails.

17. The video analyzer of claim 14, wherein validating the cryptographic signature comprises querying a trusted third-party signature authority.

18. The video analyzer of claim 14, wherein validating the cryptographic signature comprises computing a model identifier from the cryptographic signature, and determining whether the model identifier has 3D scene data capability.

19. A computer-implemented method of analyzing a video, comprising:
   separating visible two-dimensional (2D) video of a first data track from interstitial three-dimensional (3D) scene data of a second data track, wherein the second track comprises at least one 3D scene associated with a keyframe of the first track;
   analyzing the 3D scene data for consistency;
   cryptographically validating a digital signature associated with the video; and
   assigning the video a reputation for authenticity according to the analyzing and the validating.

20. The method of claim 19, further comprising assigning the video a suspicious reputation if validating the cryptographic signature fails.

* * * * *